SYSTEMS FOR INTRODUCING VIBRATO
Filed March 4, 1964
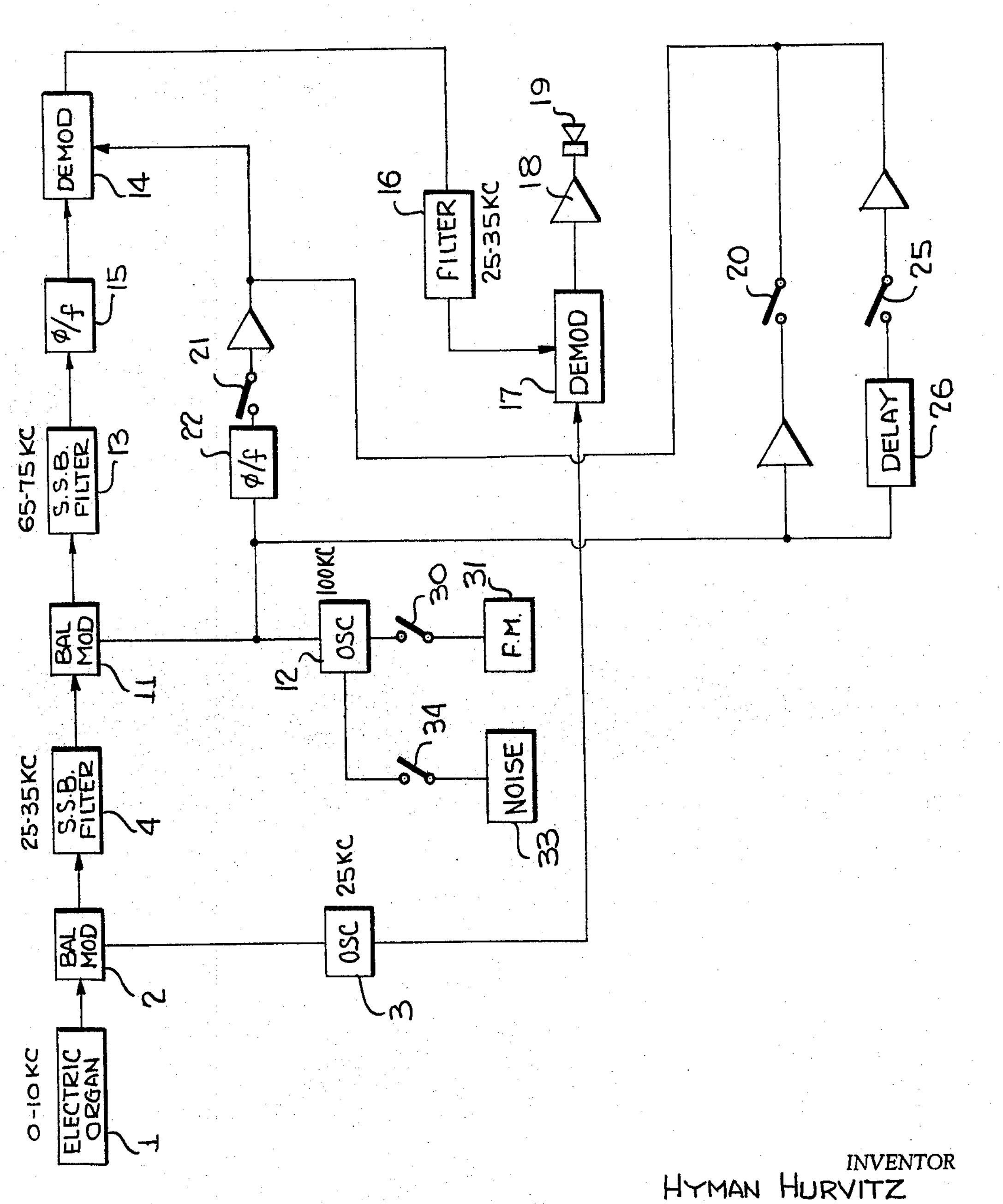
INVENTOR
HYMAN HURVITZ
BY Hurvitz & Rose
ATTORNEYS 3,267,199

SYSTEMS FOR INTRODUCING VIBRATO

Hyman Hurvitz, 822 Warner Bldg., Washington, D.C.

Filed Mar. 4, 1964, Ser. No. 349,393
9 Claims. (Cl. 84—1.25)

The present invention relates generally to music systems, and more particularly to systems for introducing vibrato, and random amplitude, frequency and phase variations into electrical tone signals.

Briefly describing the invention, an audio band representing music is heterodyned to a supersonic range, and then returned to the audio range. The same oscillator is used to heterodyne up and down, but the oscillations are led to the demodulator, but not the modulator, via a phase-frequency ($\phi/f$) filter, i.e. one which displaces phase as a function of frequency. The oscillator is frequency modulated, by noise, or vibrato, or both, whereby the $\phi/f$ filter introduces a shift of frequency and of phase. The oscillator may be supplied with noise as a B+ source, whereupon both its amplitude and its frequency will vary at random. The $\phi/f$ network introduces delay, so that the oscillations at the modulator and demodulator are not at the same frequency and/or amplitude at any given instant of time. The frequency modulation may be at a vibrato rate and give rise to vibrato effects in the output audio band, or be random, giving rise to random frequency deviations in the output audio band.

It is, accordingly, an object of the invention to provide a heterodyne system of frequency modulation, phase randomization and amplitude randomization, of an audio band representing music.

The above and still further objects, features and advantages of the present invention will become apparent upon consideration of the following detailed description of one specific embodiment thereof, especially when taken in conjunction with the accompanying drawings, wherein:

The single figure is a block diagram of a system according to the invention.

In the figure, 1 is an electric organ, which may employ phase locked oscillators, i.e. a frequency divider chain for each tone of a given musical nomenclature, or independent oscillators or tone generators of any type. Alternatively, 1 may be any source of electronic music.

The output of source 1 is applied to a first balanced modulator 2, to which is also applied the output of fixed frequency heterodyne oscillator 3, perhaps at 25 kc. Sideband filter 4 selects the upper sideband, say 25–35 kc. The output of the modulator 11 is again heterodyned in a balanced modulator 11, having a heterodyne oscillator 12 of perhaps 100 kc. The lower side band of 65–75 kc. is selected by filter 13 and applied to heterodyne demodulator 14, via $\phi/f$ network 15. The output of the demodulator, employing oscillator 12 as heterodyne oscillator recovers the band 25–35 kc., by means of filter 16. The latter band is heterodyned in demodulator 17, by means of oscillator 3, to recover the original audio band, which is applied to and selected by audio amplifier 18 and speaker 19.

If switch 30 is closed and a frequency modulator 31 thus connected to oscillator 12, this does not affect the results, above described, since the audio output is the same as the audio input for any oscillator frequency.

If switch 20 is open and 21 closed, oscillator 12 proceeds to demodulator 14 via a $\phi/f$ network 22, per Bode Patent No. 1,828,454, which produces a flat amplitude response with frequency but a monotonic shift of phase delay with frequency, the effects are different. Assume, for example, that $\phi/f$ network 22 provides a $4\pi$ radian delay at 100 kc., which increases to $8\pi$ radians at 110 kc. and decreases to 0 at 90 kc. Then, the oscillator 12 being frequency modulated at 6 c.p.s., with deviation of oscillator 12 extending between 110 kc. and 90 kc., the frequency applied to the demodulator 14 will be different generally from the frequency applied to modulator 11, by virtue of a varying frequency shift produced by $\phi/f$ network 22. This phenomenon is readily explained by noting that frequency is rate of change of phase, i.e.

$$f=\frac{d\phi}{dt}$$

It follows that the slope of $\phi$ versus $f$ for filter 22 can be so adjusted relative to the deviation of oscillator 12 at a 6 c.p.s., rate that vibrato modulated audio appears at speaker 17. If switches 20 and 21 are both closed, a complex vibrato will ensue having unmodulated and modulated characters simultaneously.

If we now assume that oscillator 12, instead of being supplied with steady B+ from source 30, is supplied (only or additionally) with B+ from a noise source 33, both the amplitude and frequency of oscillator 12 will vary at a random rate, but only one frequency will be present at a time in its output. If now, switch 20 is closed and 21 opened, there will be random amplitude of output at speaker 17, but not of frequency. If switch 21 is closed and 20 opened, however, both frequency and amplitude of the audio output of the system will occur, since now the random shifts of frequency of oscillator 12 will be translated into random variations of phase delay in $\phi/f$ filter 28, and these in turn will be translated into differences of oscillator frequency and oscillator amplitude at modulator and demodulator.

Similarly, if switch 25 is closed and 20, 21 open, then any change in the frequency of oscillator 12 will be communicated to demodulator 14 only after a delay, provided by delay unit 26. Therefore, a variation in audio output will occur, when noise source 31, or frequency modulator 19, is in circuit, or both.

There is an essential difference between the action of $\phi/f$ network 22 and delay unit 26, the difference being that between a variable phase delay for $\phi/f$ network 22, and a fixed delay for delay network 26. The delay in $\phi/f$ network 22 is a function monotonically variable as a function of frequency, while the delay in network 26 is fixed, as a function of frequency. The great advantages of $\phi/f$ network 22 are (1) that a simple network can produce the required frequency changes, and (2) that the response curve of network 22 can be shaped about as desired, i.e. design is flexible.

The influence of the $\phi/f$ network 15 is two-fold. First, the direction in which any frequency proceeds, i.e. up or down, is reversed as between oscillator 12 and filter 13. The $\phi/f$ filter 15 will thus introduce a frequency deviation of the output of filter 13 which is additive to that of oscillator 12, during frequency modulation. Second, the filter 15 will randomize relative phases of the audio output frequencies of the system, as a function of time, which filter 22 cannot accomplish.

The use of two independent heterodyne oscillators is also beneficial, since they have relative frequency and phase shifts, which contribute to randomness of output.

If desired, noise generator 34 may be connected simultaneously with closure of switches 30 and 21 (or 25), so that a sinusoidal vibrato is produced, with superposed noise vibrato and noise tremolo, as well as randomization of phases of the frequency components of the audio tones.

While a double conversion scheme is illustrated, in order that the system may be capable of handling audio frequencies as low as 16 c.p.s., which can occur in an electric organ, single conversion can be used if the frequency band of interest, and the required frequency deviations, permit. For example, only frequencies above 440 c.p.s. may be processed by the system and deviations of ±300 c.p.s. employed.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A vibrato system for music, comprising a source of an audio band, means for heterodyning said audio band to a supersonic band, said last means comprising local oscillator means, heterodyne means for recovering said audio band from said supersonic band, said last means comprising a heterodyne demodulator and said local oscillator means, and a delay network interposed between said local oscillator means and said demodulator, wherein is provided means for varying the frequency of said local oscillator means at a rate and with a deviation selected to provide audible effects in the recovered audio band.

2. The combination according to claim 1 wherein said means for varying the frequency of said local oscillator means includes a noise source connected to said local oscillator.

3. The combination according to claim 1 wherein said delay network introduced a fixed delay as a function of frequency.

4. The combination according to claim 1 wherein said delay network is a network having a finite slope of phase delay as a function of frequency.

5. The combination according to claim 1 wherein said audible effects are noise effects.

6. The combination according to claim 1 wherein is further provided means for randomizing the phases of the recovered audio band.

7. In a music system, a source of an audio band, first means for heterodyning said audio band to a supersonic band, second means for heterodyning said supersonic band to a further audio band, common frequency modulated oscillator means for applying heterodyne oscillations to said first and second means, and means for introducing time delay between said oscillations as applied to said first and second means, whereby heterodyne oscillator frequencies at said first and second means are always different.

8. The combination according to claim 7 wherein said frequency modulated oscillator means includes an oscillator having a noise source as a power source.

9. The combination according to claim 7 wherein is provided means for randomizing the relative phases of the frequencies of said supersonic band as a function of the frequency of said local oscillator means.

No references cited.

ARTHUR GAUSS, *Primary Examiner.*

D. D. FORRER, *Assistant Examiner.*